(No Model.)

S. W. SHOREY.
RIVET.

No. 316,841. Patented Apr. 28, 1885.

Witnesses.
John F. C. Vinkert
B. J. Noyes

Inventor.
Samuel W. Shorey
by Crosby & Gregory attys.

UNITED STATES PATENT OFFICE.

SAMUEL W. SHOREY, OF BOSTON, MASSACHUSETTS.

RIVET.

SPECIFICATION forming part of Letters Patent No. 316,841, dated April 28, 1885.

Application filed July 21, 1884. (No model.)

*To all whom it may concern:*

Be it known that I, SAMUEL W. SHOREY, of Boston, county of Suffolk, State of Massachusetts, have invented an Improvement in Rivets, of which the following description, in connection with the accompanying drawings, is a specification, like letters on the drawings representing like parts.

My invention relates to rivets especially intended for leather or fabric or other soft material, the rivet having a head, which rests upon one side of the material, and being used in connection with a washer on the other side of the material, upon which the shank of the rivet, passed through the material from side to side, is upset to fasten it. Rivets for this kind of work have heretofore had their shanks of substantially uniform thickness throughout, and of sufficient thickness to fill the hole or opening of the washer, upon which the rivet-shank is upset, so as to engage the washer all around the rivet-hole. With rivets of this kind a hole must be made in the material to be riveted prior to applying the said rivet, and the work of upsetting has to be very carefully done, as otherwise the washer will work off from the rivet.

The main object of my invention is to enable the rivets to be more quickly and securely applied than those heretofore in use; and the invention consists, partly, in a pointed rivet, which may be driven through the material without previously making a hole therein; and the invention further consists in the combination, with such a rivet, of a washer having a tubular neck, through which the rivet passes, the rivet being upset upon the washer at the base of the said neck.

Figure 1:
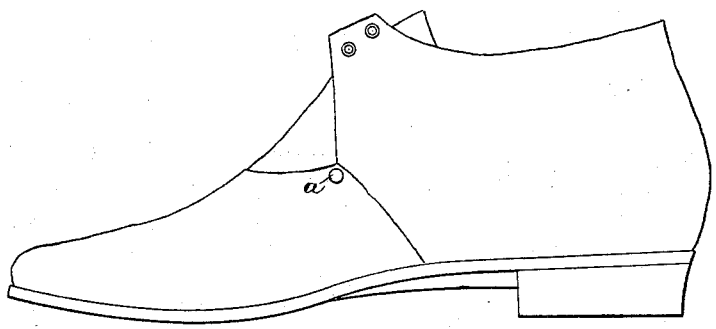
Figure 3:
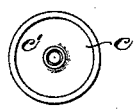
Figure 2:
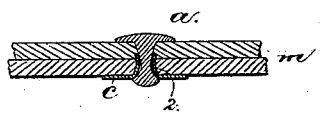
Figure 4:
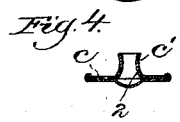
Figure 5:
Figure 6:
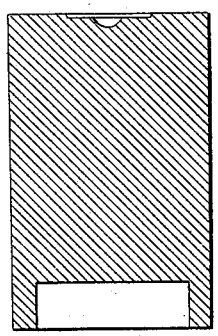

Figure 1 is a side elevation of a shoe having a seam stayed by a rivet embodying this invention; Fig. 2, a longitudinal sectional view of a rivet embodying this invention inserted in and uniting layers of material; Figs. 3 and 4, plan and sectional views, respectively, of a modification of the washer; Fig. 5, a side elevation of the rivet before being inserted through the material and washer and upset, and Fig. 6 a longitudinal section of a die for upsetting rivets made in accordance with this invention.

As shown in Fig. 1, the rivet $a$ is used to stay the seam between the quarter and vamp of a shoe; but it is obvious that it may be used wherever it is desired to fasten together two or more layers of material, or for any purpose for which rivets are commonly employed. The rivet $a$ (see Fig. 5) has a pointed shank, which will readily pierce the material $m$ (see Fig. 2) and enter the openings of the washer $b\ c$. The said washer has a neck, $c'$, made integral with it, and constituting the passage through which the shank of the rivet enters, the said neck being preferably somewhat contracted or tapering from its junction with the main or flat portion of the washer, as shown at 2, and also, preferably, the open end of the said neck is expanded to co-operate with the shank of the rivet.

In applying the rivets to the material to be riveted the washer $c$ is placed with the neck upward on a support or die, $d$, (see Fig. 6,) having a recess, $d'$, to receive the said washer and an anvil or clinching-surface, $d^2$, which underlies the neck of the washer when in the said recess. The material to be riveted is then placed in proper position over the washer and the rivet $a$ forced down through the material and neck of the washer, the head of the rivet forcing the material down about the neck of the washer, and the point of the rivet, striking the anvil $d^2$, is turned back or upset, filling the contracted neck of the washer, as shown in Fig. 2, thus securely fastening the rivet and washer together, and holding the material securely between them.

The anvil $d^2$ may be made to give the projecting end of the rivet any desired shape, and the washer may, if desired, be provided with a thin cap, $c^2$, shaped to fit within and be supported by the die, so that the rivet is upset in the inner surface of the said cap, and is inclosed within the said cap, which forms a finish for the washer.

The neck $c'$ of the washer affords a long bearing on the shank of the rivet, so that the washer cannot tilt or tip on the said shank, and thus become detached therefrom, as frequently happens when washers without necks are used; and by having the shank of the rivet upset in and fill the tapering passage in the neck of the washer an extremely strong fastening is afforded.

I claim—

1. A rivet composed of a solid head and conical-pointed shank, combined with a washer having a disk-like main portion and an integral tubular neck rising from the center of the main portion, and being slightly contracted or lessened in diameter between its junction with said main portion and its opposite end, substantially as and for the purpose set forth.

2. A washer having a main portion or head provided with a central opening and a tubular neck integral with the head and rising therefrom, in the manner and for the purpose set forth.

In testimony whereof I have signed my name to this specification in the presence of two subscribing witnesses.

SAMUEL W. SHOREY.

Witnesses:
   JOS. P. LIVERMORE,
   W. H. SIGSTON.